United States Patent [19]

Chibnik

[11] Patent Number: 4,524,007
[45] Date of Patent: Jun. 18, 1985

[54] POLYESTER DEMULSIFIERS AND COMPOSITIONS THEREOF

[75] Inventor: Sheldon Chibnik, Cherry Hill, N.J.

[73] Assignee: Mobil Oil Corporation, New York, N.Y.

[21] Appl. No.: 490,627

[22] Filed: May 2, 1983

[51] Int. Cl.³ .............................................. C10M 1/26
[52] U.S. Cl. ................................ 252/56 R; 252/331; 252/340
[58] Field of Search ...................... 252/56 R, 331, 340

[56] References Cited

U.S. PATENT DOCUMENTS

| | | | |
|---|---|---|---|
| 2,950,299 | 8/1960 | Kirkpatrick | 250/340 |
| 2,950,313 | 8/1960 | Kirkpatrick | 252/340 |
| 3,871,837 | 3/1975 | Bedague et al. | 252/56 R |

Primary Examiner—Jacqueline V. Howard
Attorney, Agent, or Firm—Alexander J. McKillop; Michael G. Gilman; Howard M. Flournoy

[57] ABSTRACT

Compounds comprising ether capped alcohols, particularly alkoxy polyalkylene glycols with organic acids are highly effective demulsifier additives when incorporated into various liquid hydrocarbyl lubricant media.

21 Claims, No Drawings

POLYESTER DEMULSIFIERS AND COMPOSITIONS THEREOF

BACKGROUND OF THE INVENTION

1. Field of the Invention

This invention is directed to compounds and compositions thereof having effective demulsifying characteristics. More particularly, this invention is directed to additive compounds prepared by esterification of ether capped alcohols, and in particular alkoxy polyalkylene glycols capped with organic acids. These compounds have been found to be highly useful in hydrocarbyl lubricants.

2. Discussion of the Prior Art

The chemistry on esters of alkoxy-terminated polyalkylene glycols is well established and thus well known. See, for example, U.S. Pat. No. 3,278,585, which relates to a process for esterifying secondary alkanols with carboxylic acids. Such esters are most often described in the art as surface active agents having application as emulsifiers.

U.S. Pat. No. 3,684,734 discloses the use of high molecular weight non-ether capped derivatives of block copolymers of ethylene oxide and 1,2-propylene oxide as demulsifiers for crude oil emulsions and U.S. Pat. No. 3,278,585 discloses a method of preparing ether alcohols and thereafter esterifying with an acid catalyst. U.S. Pat. No. 4,125,382 discloses the use of polyoxyalkalene ethers as demulsifiers in liquid hydrocarbon fuels. It is well known in the art that such disclosures due to the specificity of the additives and the compositions thereof in terms of their application for functionality are not indicative of whether such additives will function in like manner in any other compositions. A compound may be an emulsifier in a fuel and a demulsifier in an oil or vice versa or have no application at all in another composition. It is believed, therefore, that the instant invention is novel and patentable over the prior art. No prior art known to applicant discloses the use of esters of ether capped alcohols as demulsifier agents in lubricants.

SUMMARY OF THE INVENTION

In accordance with the invention, there is provided a lubricant composition comprising a major proportion of an oil of lubricant viscosity or grease prepared therefrom and a minor, but effective demulsifying amount of an additive prepared by esterification of an ether capped alcohol such as an alkoxy polyalkylene glycol with an organic acid.

Lubricant compositions disclosed herein may also contain other known additives for their known purposes. These materials when blended into lubricating oil compositions significantly enhance separation of water from the system, i.e., impart demulsifying characteristics to the lubricating composition.

DESCRIPTION OF SPECIFIC EMBODIMENTS

Generally speaking the compounds in accordance with the invention can be prepared as follows:

A commercially available ether capped polyalkylene glycol prepared by reacting an alkylene epoxide with a monohydric alcohol is esterified with a polycarboxylic acid to yield the desired ester. The basic equation for this reaction is as described below:

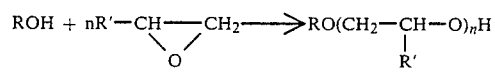

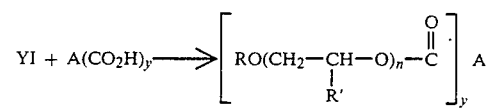

where R and R' may each be $C_1$–$C_8$ alkyl and R may also be $C_1$–$C_8$ alkylated phenol and when n is 2 to 4 and y is 1 to 4. A equals an aromatic ring having adjacent carboxylic groups or anhydride groups. The aromatic rings may be coupled as in BTDA; A may also be an unsubstituted bridged alicyclic ring containing two adjacent carboxylic acids (or anhydride). For example, A may be I, II, IV, V and VI below, but not III or VII:

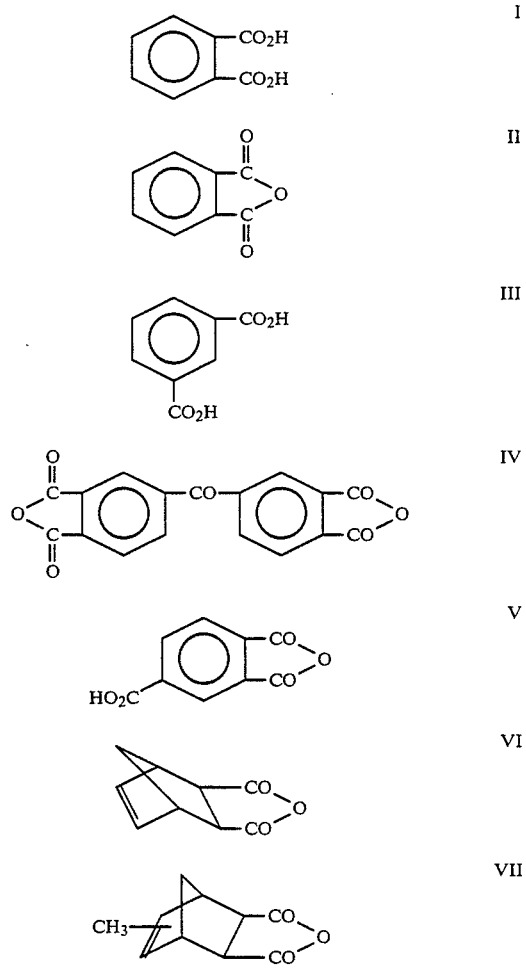

The last two examples show how specific the demulsifiers in accordance herewith are. VI is an effective demulsifier but compound VII isn't.

The carboxylic acid is preferably aromatic having from about 2–4 carboxyl groups, except in the case of acids such as endomethylene tetrahydrophthalic acid. The degree of polymerization is limited to about 4 and preferably to about 2 to 3. The length of capping alkyl ether is limited to about $C_{14}$ and preferably at about $C_4$–$C_6$. There are further limiting factors in terms of the instant monoesters molecular weight. Critical to the success of the invention are the specific components of the compounds used herein; one end of the chain must be capped with an ester, there must be the requisite number of oxide units of the length of the alkyl group attached thereto and their shape all have a direct bearing upon the ability of the compound as a whole to function as a demulsifier.

It is understood that the preparation of the demulsifier additives in accordance with the invention is not limited to the manner disclosed hereinabove. The desired esters may be prepared in any convenient manner known in the art. The method of esterification is not critical. Since both components are high boiling, simply heating the reactants in an open vessel at a temperature high enough to drive the reaction to a low acid valve in a reasonable time without loss of the alcohol by vaporization is even acceptable. Other methods for synthesis of esters such as use of a catalyst, azeotropic removal of water, transesterification of esters, etc. may also be used. The alcoholic reactant may be present in excess and can be removed at the end of the reaction by stripping, washing or other convenient means.

The lubricants which may be used with compounds of this invention comprise mineral and synthetic lubricant oils and mixtures thereof or greases prepared therefrom. The mineral oils will be understood to include not only the paraffinic members, but also the naphthenic members. By synthetic oils are meant synthetic hydrocarbons, polyalkylene oxide oils, polyacetals, polysilicones, as well as synthetic ester oils. Included among the latter type are those esters made from monohydric alcohols and polycarboxylic acids such as 2-ethylhexylazelate and the like having up to about 36 or more carbon atoms. Also included are those esters made from polyhydric alcohols and aliphatic monocarboxylic acids. In this group are found esters prepared from (1) the primary alcohols such as the octane, propane and butane derivatives thereof, (2) 2,2-disubstituted propane diols and (3) the pentaerythritols reacted with oleophilic monocarboxylic acids containing from about 4 to 9 carbon atoms. Mixtures of these acids may be used to prepare the esters. Preferred among the esters are those made from pentaerythritol and a mixture of $C_5$–$C_9$ acids.

Alcohols suitable for use herein include, but are not limited to the following: methyl, ethyl, butyl, etc., 2-ethylhexyl, octyl, etc. ether capped alcohols, phenol, cresol, octylphenol and the like preferred are such alcohols as 2-(2-n-butoxyethoxy)ethanol and the like.

Organic acids especially suitable for use herein are carboxylic or polycarboxylic acids and their corresponding anhydrides or dianhydrides and more particularly those acids that are aromatic or unsubstituted bridged alicyclic acids with more than two carboxyl groups. They include, but are not limited to the following: Phthalic, trimellitic, benzophenonetetracarboxylic, pyromellitic acids or anhydrides thereof.

As noted hereinabove, the products disclosed are useful demulsifying additives or agents particularly for lubricants. When so used, they are added in amounts sufficient to impart such properties to the lubricant composition. More particularly, such properties will be imparted to the lubricant by adding from about 0.01% to about 10% by weight, preferably from about 0.04% to about 0.1% of the total product.

Having discussed the invention in broad and general terms, the following are offered to illustrate it and it is to be understood that the examples are merely illustrative and are not intended to limit the scope of the invention.

PREFERRED EMBODIMENTS

EXAMPLE 1

Synthesis of the tetraester of 2-(2-n-butoxyethoxy)ethanol of pyromellitic anhydride Pyromellitic dianhydride (31.5 g, 0.14 moles) and 2-(2-n-butoxyethoxy)ethanol (140.6 g, 0.87 moles) were charged to a stirred flask and heated to 200° C. A slow stream of nitrogen was passed through the mass and the water formed in the reaction was allowed to escape. The reaction was held at temperature for sixteen hours and then stripped of excess alcohol under vacuum at 160° C.

EXAMPLE 2

Synthesis of the 2-(2-n-butoxyethoxy)ethanol diester of endomethylene tetrahydrophthalic anhydride 2,3-Bicyclo [2.2.1] heptane dicarboxylic acid anhydride (43.6 g, 0.265 moles) and commercial butyl carbitol (86.2 g, 0.532 moles) were reacted as in Example 1.

A lubricating oil was blended with the compositions shown below and subjected to the well known ASTM D-1401 test for emulsion characteristics of steam-turbine oils. A blend without a demulsifier will typically show a break time of 25 to 30 minutes. A low value is required for the additive to be effective. (Tests designated emulsive did not break in 60 minutes.) The test blends comprised 0.2% by weight of a standard additive package containing an antirust and an antioxidant agent, 0.05% by weight of the test demulsifier in 99.75% by weight of a 160" solvent refined paraffinic neutral mineral oil. The test data is tabulated in Table.

TABLE 1

| | DEMULSIFIER EXPERIMENTS (ASTM D 1401) | | | | |
|---|---|---|---|---|---|
| EXAMPLE NO. | ALKYL | ETHER | NO. EOS | ACID | BREAK TIME |
| 1 | Butyl | Ethoxy | 2 | PMDA | 12 |
| 2 | Butyl | Ethoxy | 2 | Trimellitic | 7 |
| 3 | Methyl | Ethoxy | 3 | PMDA | 16 |
| 4 | Butyl | Ethoxy | 3 | PMDA | 8 |
| 5 | Butyl | Ethoxy | 7 | PMDA | 33 |
| 6 | Butyl | Ethoxy | 28 | PMDA | 37 |
| 7 | Butyl | Ethoxy | 2 | Phthalic | 19 |
| 8 | Butyl | Ethoxy | 2 | Isophthalic | Insoluble |
| 9 | Butyl | Ethoxy | 2 | Terephthalic | 28 |
| 10 | Butyl | Ethoxy | 1 | PMDA | 17 |
| 11 | Butyl | Ethoxy | 2 | endo-$CH_2$—THPA | 12 |
| 12 | Butyl | Ethoxy | 2 | BTDA | 12 |
| 13 | Methyl | Propoxyl | 2 | PMDA | Insoluble |
| 14 | Butyl | Ethoxy | 2 | $C_{18}$/MA copoly | 39 |

TABLE 1-continued

| DEMULSIFIER EXPERIMENTS (ASTM D 1401) | | | | | |
|---|---|---|---|---|---|
| EXAMPLE NO. | ALKYL | ETHER | NO. EOS | ACID | BREAK TIME |
| 15 | Butyl | Ethoxy | 3 | $C_9$ succinic | 28 |
| 16 | Butyl | Ethoxy | 2 | Hexahydro PA | 27 |
| 17 | Methyl | Propoxyl | 3 | PMDA | 19 |
| 18 | (*Diester) | Ethoxy | UNK | 2-et-hexoic | 36 |
| 19 | (*Diester) | Ethoxy | 3 | 2-et-butyric | 25 |
| 20 | $C_8$ Phenyl | Ethoxy | 1 | BTDA | Insoluble |
| 21 | $C_8$ Phenyl | Ethoxy | 3 | BTDA | 17 |
| 22 | $C_8$ Phenyl | Ethoxy | 5 | BTDA | Emulsive |
| 23 | $C_9$ Phenyl | Ethoxy | 10 | BTDA | Insoluble |
| 24 | $C_6-C_8$ | Ethoxy | 3 | BTDA | 11 |
| 25 | Butyl | Ethoxy | 2 | Benzoic | 38 |
| 26 | $C_9$ Phenyl | Propoxy | 1 | PMDA | Insoluble |
| 27 | Butyl | Ethoxy | 2 | Methyl THPA | 29 |
| 28 | Butyl | Ethoxy | 2 | $\alpha,\omega$ $C_{12}$ Dioic | 36 |
| 29 | Butyl | Ethoxy | 2 | THPA | 28 |
| 30 | $C_9-C_{11}$ | Ethoxy | 3 | BTDA | Emulsive |
| 31 | $C_9-C_{11}$ | Ethoxy | 8 | BTDA | Emulsive |
| 32 | $C_{12}-C_{15}$ | Ethoxy | 3 | BTDA | Emulsive |
| 33 | Butyl | Ethoxy | 2 | 2-et-hexoic | 37 |
| 34 | Butyl | Ethoxy | 2 | TDC diacid | 37 |
| 35 | Butyl | Ethoxy | 2 | Methendic ANH | 26 |

(1) Unless specified as otherwise refers to alkyl alcohol/
(2) See the general reaction as set in the Summary hereinabove

TABLE 2

ABBREVIATIONS

Polyalkoxy
1 Ethoxy - R' = H
2 Propoxyl - R' = $CH_3$

Alkyl (R)
1 Methyl
2 Butyl
3 $C_8$ Phenyl - commercial, mixed octylphenol
4 $C_9$ Phenyl - commercial, mixed octylphenol
5 $C_6-C_8$
6 $C_9-C_{11}$ commercial mixtures
7 $C_{12}-C_{15}$
8 (*Diester) - no R cap; ester on both ends of polyoxyethylene Acid
1 PMDA - Pyromellitic dianhydride
2 BTDA - 3,3', 4,4' benzophenonetetracarboxylic dianhydride
3 phthalic
4 isophthalic
5 terephthalic
6 trimellitic
7 $C_{18}$/MA copoly - octadecene-malaic anhydride copolymer
8 $C_9$ succinic - nonenyl succinic anhydride
9 hexahydro PA - hexahydro phthalic anhydride
10 endo-$CH_2$—THPA - endomethylene tetrahydrophthalic anhydride
11 2-et-hexoic
12 2-et-butyric
13 methyl THPA - methyl tetrahydrophthalic anhydride
14 $\alpha,\omega$-$C_{12}$ dioic - 1, 12 dodecanedioic acid
15 THPA - tetrahydrophthalic anhydride
16 benzoic
17 TCD diacid - tricyclo $(5.2.1.0^{2,6})$decane-3(4), 8(9) dicarboxylic acid
18 methendic anh -methyl endomethylene tetrahydrophthalic anhydride It is clear from the data shown above, that additives in accordance with the invention provide the desired demulsifier properties to lubricant compositions. However, increasing the alkyl chain much beyond $C_4$ causes problems in the additives demulsifying characteristics. Note the break time of a $C_6-C_8$ additive (Example 24) having alkyl chain is only 11 minutes and a $C_9-C_{11}$ alkyl chain (Example 30) is emulsive. Increasing the number of ether groups appears to be most effective when the alkyl group is so limited, see for example, Examples 30 and 31 where $C_9-C_{11}$ alkyl ethoxy ethers having 3 to 8 ether groups respectively are both emulsive. A comparison of Examples 6 and 12 reveals that all other factors equal increasing the number of ether groups from 2 to 8 in a butyl alkyl additive decreases the break time from 37 to 12 minutes. Examples 7, 12 and 35 illustrate non-aromatic esters.

Although the present invention has been described with preferred embodiments, it is to be understood that modification and variations may be resorted to, without departing from the spirit and scope of this invention, as those skilled in the art will readily understand. Such modifications and variations are considered to be within the purview and scope of the appended claims.

I claim:

1. A composition comprising a major amount of an oil of lubricating viscosity or grease prepared therefrom and a minor effective demulsifying amount of an additive compound prepared by esterifying an ether capped alcohol with a carboxylic or polycarboxylic acid, anhydride or dianhydride thereof wherein the carboxylic acid is an aromatic or unsubstituted bridged alicyclic acid or anhydride thereof having at least two carboxyl groups.

2. The composition of claim 1 containing the demulsifying additive in an amount from about 0.01 wt. % to about 5 wt. %.

3. The composition of claim 1 containing the demulsifying additive in an amount from about 0.01 wt % to about 0.2 wt %.

4. The composition of claim 1 wherein said ether capped alcohol is an ether capped polyalkylene glycol prepared by reacting an alkylene epoxide with a monohydric alcohol.

5. The composition of claim 4 wherein the alkylene moiety contains from about 2 to about 36 carbon atoms.

6. The composition of claim 4 wherein the epoxide contains from 2 to about 8 carbon atoms.

7. The composition of claim 6 wherein the epoxide contains from 2 to 3 carbon atoms.

8. The composition of claim 7 wherein the epoxide is selected from propylene oxide, ethylene oxide or mixtures thereof.

9. The composition of claim 4 wherein the additive compound is the tetraester of 2-(2-n-butoxyethoxy)ethanol and pyromellitic dianhydride.

10. The composition of claim 1 wherein the lubricating oil is selected from a mineral oil, a synthetic oil or mixtures thereof.

11. A product comprising a major amount of an oil of lubricating viscosity or grease prepared therefrom and a minor effective demulsifying amount of an additive compound prepared by esterifying an ether capped alcohol with a carboxylic or polycarboxylic acid, anhydride or dianhydride thereof wherein the carboxylic acid is an aromatic or unsubstituted bridged alicyclic acid or anhydride thereof having at least two carboxyl groups.

12. The product of claim 11 wherein the ether capped alcohol is a $C_8$ alkylated phenol.

13. The product of claim 11 wherein the ether capping component is from about $C_1$–$C_6$.

14. The product of claim 11 wherein said additive is polymerized and thereafter limited to about four units per polymer.

15. The composition of claim 1 wherein the carboxylic acid or anhydride thereof is aromatic and has from 2 to about 4 carboxyl groups.

16. The composition of claim 4 wherein said additive compound is prepared by esterifying said ether capped polyalkylene glycol with a polycarboxylic acid or anhydride thereof.

17. The composition of claim 9 wherein the reaction is carried out in a molar ratio of 2-(2-n-butoxyethoxy)ethanol to pyromellitic dianhydride of about 6:1.

18. The composition of claim 1 wherein the additive compound is the 2-(2-n-butoxyethoxy)ethanol diester of endomethylene tetrahydrophthalic anhydride.

19. A product comprising a major amount of an oil of lubricating viscosity or grease prepared therefrom and a minor effective amount of a demulsifying additive consisting essentially of the tetraester of 2-(2-n-butoxyethoxy)ethanol of pyromellitic anhydride.

20. A product comprising a major amount of an oil of lubricating viscosity or grease prepared therefrom and a minor effective demulsifying amount of an additive consisting essentially of the 2-(2-n-butoxyethoxy)ethanol diester of endomethylene tetrahydrophthalic anhydride.

21. A method of imparting effective demulsifying characteristics to oils of lubricating viscosity or greases prepared therefrom comprising adding thereto from about 0.01 to about 5 wt.% of an ether capped alcohol prepared by esterifying said alcohol with a carboxylic acid or anhydride thereof selected from the group consisting of an aromatic or unsubstituted bridged alicyclic acid or anhydride thereof having at least two carboxyl groups.

* * * * *

UNITED STATES PATENT AND TRADEMARK OFFICE
CERTIFICATE OF CORRECTION

PATENT NO. : 4,524,007

DATED : June 18, 1985

INVENTOR(S) : Sheldon Chibnik

It is certified that error appears in the above-identified patent and that said Letters Patent is hereby corrected as shown below:

```
Column 4, line 52, after Table insert --1--.
Column 7, line 16, change "capping" to --capped--.
Column 7, line 16, change "component" to --alcohol--.
```

Signed and Sealed this

Seventh Day of January 1986

[SEAL]

Attest:

DONALD J. QUIGG

Attesting Officer

Commissioner of Patents and Trademarks